US006624547B1

United States Patent
Emery

(10) Patent No.: US 6,624,547 B1
(45) Date of Patent: Sep. 23, 2003

(54) POWER SYSTEM HAVING STATOR COILS FOR GRADING VOLTAGE BETWEEN INNER VENT TUBES AND COIL STRANDS AND ASSOCIATED METHODS

(75) Inventor: Franklin T. Emery, Ft. Payne, AL (US)

(73) Assignee: Siemens Westinghouse Power Corporation

( * ) Notice: Subject to any disclaimer, the term of this patent is extended or adjusted under 35 U.S.C. 154(b) by 108 days.

(21) Appl. No.: 09/670,626

(22) Filed: Sep. 27, 2000

(51) Int. Cl.[7] .............................. H02K 3/14; H02K 1/12
(52) U.S. Cl. ........................................ 310/254; 310/213
(58) Field of Search ............................... 310/254, 213, 310/227, 208

(56) References Cited

U.S. PATENT DOCUMENTS

| | | | | |
|---|---|---|---|---|
| 2,415,652 A | | 2/1947 | Norton | 174/107 |
| 2,788,456 A | * | 4/1957 | Fromm | 310/64 |
| 3,670,192 A | | 6/1972 | Andersson et al. | 310/196 |
| 4,388,546 A | | 6/1983 | Schwanzer | 310/196 |
| 4,403,163 A | * | 9/1983 | Armerding et al. | 310/213 |
| 4,853,565 A | * | 8/1989 | Elton et al. | 310/45 |
| 5,030,870 A | | 7/1991 | Wichmann | 310/215 |
| 5,066,881 A | | 11/1991 | Elton et al. | 310/213 |
| 5,067,046 A | | 11/1991 | Elton et al. | 361/220 |
| 5,323,079 A | * | 6/1994 | Nieves et al. | 310/213 |
| 5,574,325 A | | 11/1996 | von Musil et al. | 310/215 |
| 5,623,174 A | | 4/1997 | Markovitz et al. | 310/45 |
| 5,723,920 A | | 3/1998 | Markovitz et al. | 310/42 |
| 5,925,944 A | * | 7/1999 | Emery et al. | 310/45 |
| 6,043,582 A | * | 3/2000 | Markovitz et al. | 310/213 |

FOREIGN PATENT DOCUMENTS

| | | | | |
|---|---|---|---|---|
| GB | 2331860 | * | 6/1999 | H02K/3/40 |
| JP | 60102831 | | 6/1985 | |
| WO | WO9929021 A | | 6/1999 | |

* cited by examiner

*Primary Examiner*—Thomas M. Dougherty
*Assistant Examiner*—Karen Addison

(57) ABSTRACT

A stator for a power generation system and associated methods are provided. The stator preferably includes a plurality of high voltage stator coils. Each of the plurality of high voltage stator coils preferably includes a plurality of metal strands, a plurality of vent members positioned adjacent the plurality of metal strands, and compact voltage grading means contacting each of the plurality of vent members and the plurality of metal strands for grading voltage between the vent members and the metal strands to thereby prevent an overvoltage condition. The present invention also provides a method of grading voltage between internal vent members and conductive strands of a high voltage coil of a power generation system. The method preferably includes connecting conductive portions of each of a plurality of internal vent members to a plurality of conductive strands of a high voltage coil.

11 Claims, 7 Drawing Sheets

VOLTAGE BETWEEN TUBES AND COPPER = $VC_2$ WITHOUT R $VC_2 = \frac{XC_2}{XC_3 + XC_2} \cdot V_1$    X = CAPACITOR REACTANCE

R ≡ VOLTAGE GRADING RESISTOR $VC_2 \cong \frac{R}{XC_3 + R} \cdot V_1$ (WITH R IN CIRCUIT) AND R >> $XC_2$

POWER SYSTEM HAVING STATOR COILS FOR GRADING VOLTAGE BETWEEN INNER VENT TUBES AND COIL STRANDS AND ASSOCIATED METHODS

FIELD OF THE INVENTION

This invention is related to the power generation industry and, more particularly, to the field of electrical power generators.

BACKGROUND

In the power-generation industry, high voltage coils are often used in a stator of power generators. In inner cooled high voltage stator coils, cooling members having a tubular shape or configuration, and known as cooling tubes or vent tubes, are often used integral to or positioned within the outer confines of the coil construction. The cooling tubes are made of conductive material, e.g., a metal, and serve to pass coolant, e.g., air or hydrogen, through them to remove copper (or other conductive material) conductor heat. The tubes are usually surrounded by copper strands of the coil and extend the full length of the coil. For example, many coil designs or configurations contain five (5) or more cooling tubes in a single stack.

All of the vent tubes in a coil stack are insulated from each other and insulated from the copper strands, e.g., to prevent flow of machine or generator current in the tubes. No current from the generator is allowed to flow in the vent or cooling tubes, and the tubes are conventionally not designed to carry generator current, e.g., the tubes often have a thin-wall type construction or design. Examples of some vent or cooling tube configurations can be seen in U.S. Pat. No. 5,323,079 by Nieves et al. titled "Half-Coil Configuration For Stator" and U.S. Pat. No. 5,723,920 by Markovitz et al. titled "Stator Bars Internally Graded With Conductive Binder Tape."

In these systems, however, and with voltage on the stator coil, a large percentage of voltage often appears between the metal vent tubes and the copper strands of the coil. In order to prevent the flow of machine or generator current in the vent tubes, both the copper strands and the vent tubes are insulated. This voltage potential, if allowed to reach high values, can destroy the copper strand insulation and the vent tube insulation which respectively surrounds the strands and the tubes as described above. Therefore, vent tube voltage grading is needed to prevent the buildup of voltage between the vent tubes and the copper strands.

The method of construction of stator coils conventionally used to address this need for voltage grading is the connection of external resistors between the copper strands and the vent tubes. On some coil designs, however, no space is available to connect the resistors externally to the coil. In addition, it is impossible or can be very difficult to make connections to the inner stack or arrangement of vent tubes and, accordingly, grading cannot be readily achieved. Even though the voltage on the inner vent tubes is much lower than the top and bottom vent tubes in a stacked configuration, some magnitude of protection is still needed for these vent tubes as well.

SUMMARY OF THE INVENTION

In view of the foregoing, the present invention advantageously provides a power generation system and associated methods having voltage grading to inner vent tubes of stator coils of a stator of a power generator. Also, the present invention advantageously provides a stator having stator coils with a compact voltage grading arrangement for effectively providing voltage grading capabilities to inner vent tubes of the coils. The present invention still also advantageously provides a power generation system, stator coils, protecting devices, and associated methods which compactly reduce voltage buildup situations between venting devices and conductive strands of coils. Further, the present invention advantageously provides a stator coil and associated methods which significantly reduces insulation failure in stator coils of a power generation system.

More particularly, the present invention provide a stator for a power generation system which preferably includes a plurality of high voltage stator coils. Each of the plurality of high voltage stator coils includes a plurality of metal strands, a plurality of vent members positioned adjacent the plurality of metal strands, and compact voltage grading means contacting each of the plurality of vent members and the plurality of metal strands for grading voltage between the vent members and the metal strands to thereby prevent an over voltage condition. For example, the metal strands and vent members are often positioned in a stacked configuration and the compact voltage grading means contact even the inner vent members of the stack.

Additionally, the present invention provides an overvoltage protector for a power generation system. The overvoltage protector preferably includes at least a first conductive strip member positioned to contact one of a plurality of vent members, a voltage grading layer of material positioned to contact the first conductive strip member, and at least a second conductive strip member positioned to contact the voltage grading layer and at least one of a plurality of conductive coil strands forming a portion of a high voltage coil.

The present invention still further provides a method of grading voltage between internal vent members and conductive strands of a high voltage coil of a power generation system. The method preferably includes connecting conductive portions of each of a plurality of internal vent members to a plurality of conductive strands of a high voltage coil. The connecting step for each vent member can advantageously include forming an opening in insulation surrounding the vent members, positioning a first conductive strip member to contact conductive portions of the vent member, positioning a voltage grading layer of material to contact and overlie the first conductive strip member, and positioning a second conductive strip member to contact the voltage grading layer and at least one of the plurality of conductive strands. The voltage grading layer preferably includes a plurality of layers of conductive tape, and the step of positioning the voltage grading layer preferably includes adhering a first layer of conductive tape to the first metal strip member and the insulation surrounding the vent member and adhering a second layer of conductive tape to the insulation and the second conductive strip member.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation if used indicate similar elements in alternative embodiments.

Figure 7:
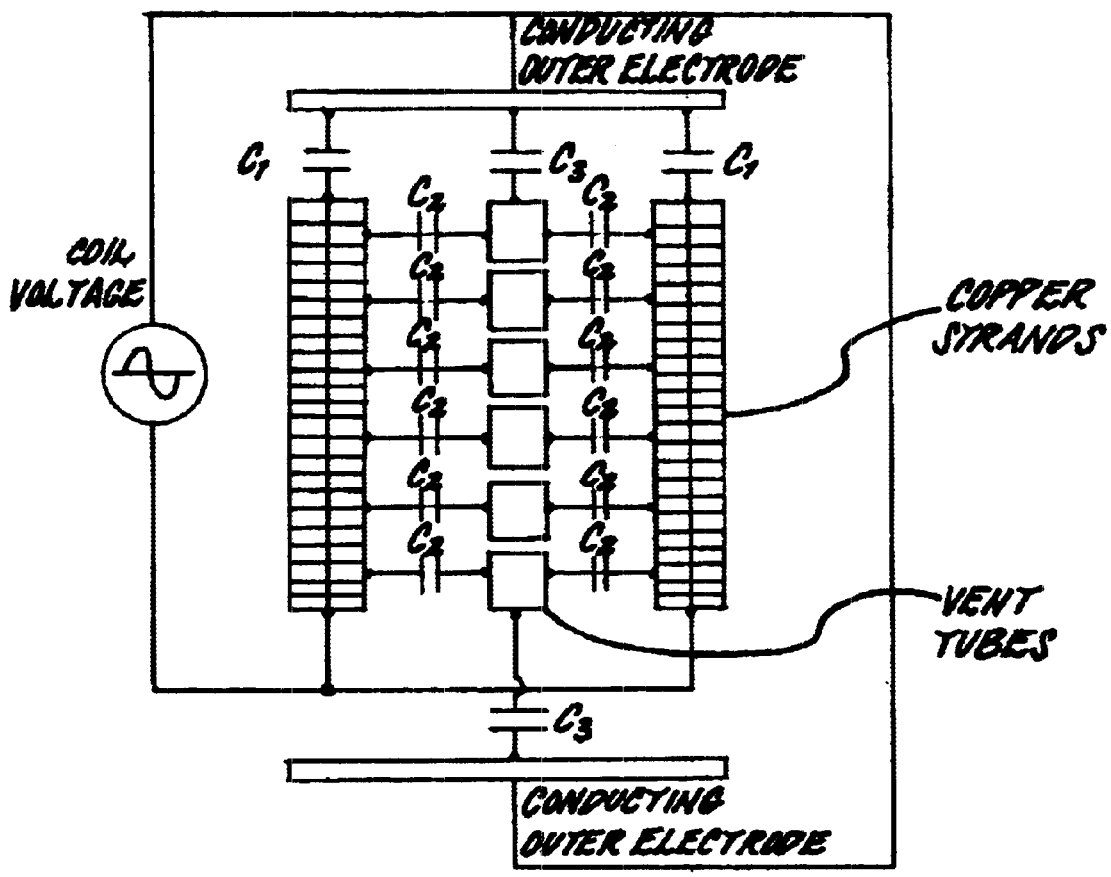
FIG. 7 is a schematic view of a system for grading voltage of a stator coil between inner vent tubes and the coil according to the present invention.

An equivalent circuit showing the internal capacitance of a stator coil 20 is illustrated in FIG. 7. For example, with a 60 Hz or 50 Hz voltage (coil voltage) applied to the stator coil 20 between the metal coil strands 22, i.e., copper, and the conducting outer electrode of the coil 20, the applied AC voltage is distributed across the groundwall insulation and the tube to copper insulation. Part of the applied voltage is coupled to the vent tubes 30 through the distributed capacitance C3. The vent-tube 30-to-copper-strand insulation is then subject to the high voltage stress level which if high enough can lead to insulation failure. Insulation failure due to overvoltage can result in copper-to-vent-tube shorting. Once two or more shorts occur, excessive current can flow in the vent tubes 30. Excessive current in the vent tubes 30 can cause the vent tubes 30 to melt and reduce the cooling effectiveness. Complete coil failure can then follow due to overheating of the coil 30. To minimize the possibility of a copper-to-tube short, it is advantageous to reduce the potential difference between the cooling tubes 30 and copper strands 22.

Figure 8:
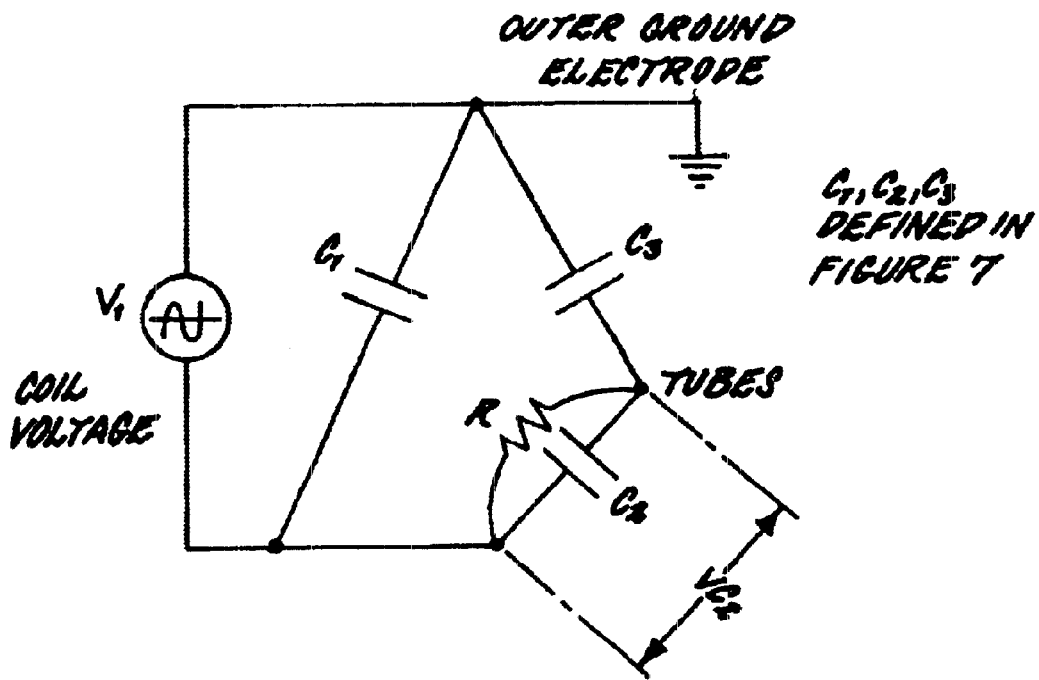
FIG. 8 is a circuit diagram of an equivalent circuit of inner coil distributed capacitance of a stator coil.

An equivalent circuit of the cross-section of an inner cooled coil is shown in FIG. 8. With an AC voltage applied to the coil 30 between the copper strands 22 and the ground electrode, a portion of the AC voltage is coupled through the capacitance (C2) that exists between the top and bottom cooling tubes and the copper coil. This coupled voltage results in a large potential difference between the cooling tubes and the coil copper. The voltage drop across a capacitance (C1) is the voltage stress between the tube and copper strands (across the insulation). The magnitude of the voltage (VC2), depends on the relative values of the distributed capacitance (C1 and C2). The magnitude of potential (VC2) is equal to V1(XC2/(XC2+XC3)). The magnitude of the potential (VC2) can reach several hundred volts with coil rated voltage of V1. The insulation between the copper and vent tubes will fail if VC2 exceeds the dielectric strength of the insulation. Once voltage breakdown occurs, then it is possible to have the copper short to the vent tube.

Reducing the coupled value of V2 can be obtained by reducing the value of the impedance associated with XC2 and this impedance can be reduced by placing a low impedance (resistance) across the C2 coupling capacitor. A low impedance connected from the coil copper to each vent tube will reduce the magnitude of the voltage (VC2) distributed between the vent tubes and copper.

Figure 1:
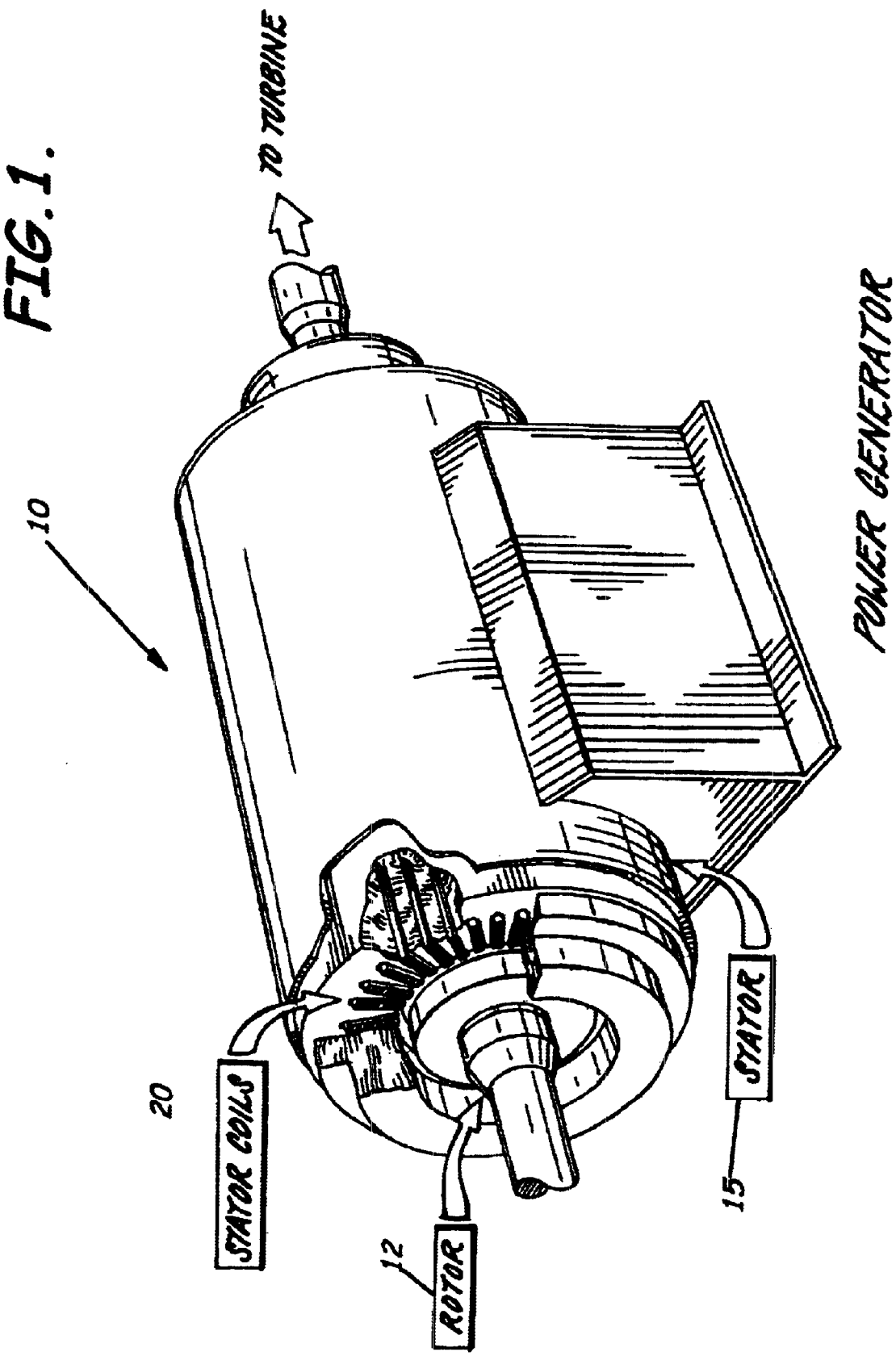
FIG. 1 is a fragmentary perspective view of a power generator showing a plurality of stator coils according to the present invention.

FIG. 1 illustrates stator coils 20 of a power generation system 10 which has a rotor 12 and a stator 15 positioned adjacent, e.g., surrounding, the rotor 12 as understood by those skilled in the art. The stator 15 preferably includes a plurality of high voltage stator coils 20 as illustrated. Each of the plurality of stator coils 20 includes a plurality of metal coil strands 22 preferably formed of copper or a copper alloy, a plurality of vent members 30, e.g., preferably provided by vent or cooling members having a tubular shape, positioned adjacent the plurality of coil strands 22, and compact voltage grading means 40 compactly contacting each of the plurality of vent members 30 for grading voltage between the plurality of metal vent members 30 and the plurality of metal strands 22 to thereby prevent an overvoltage condition.

Figure 2:
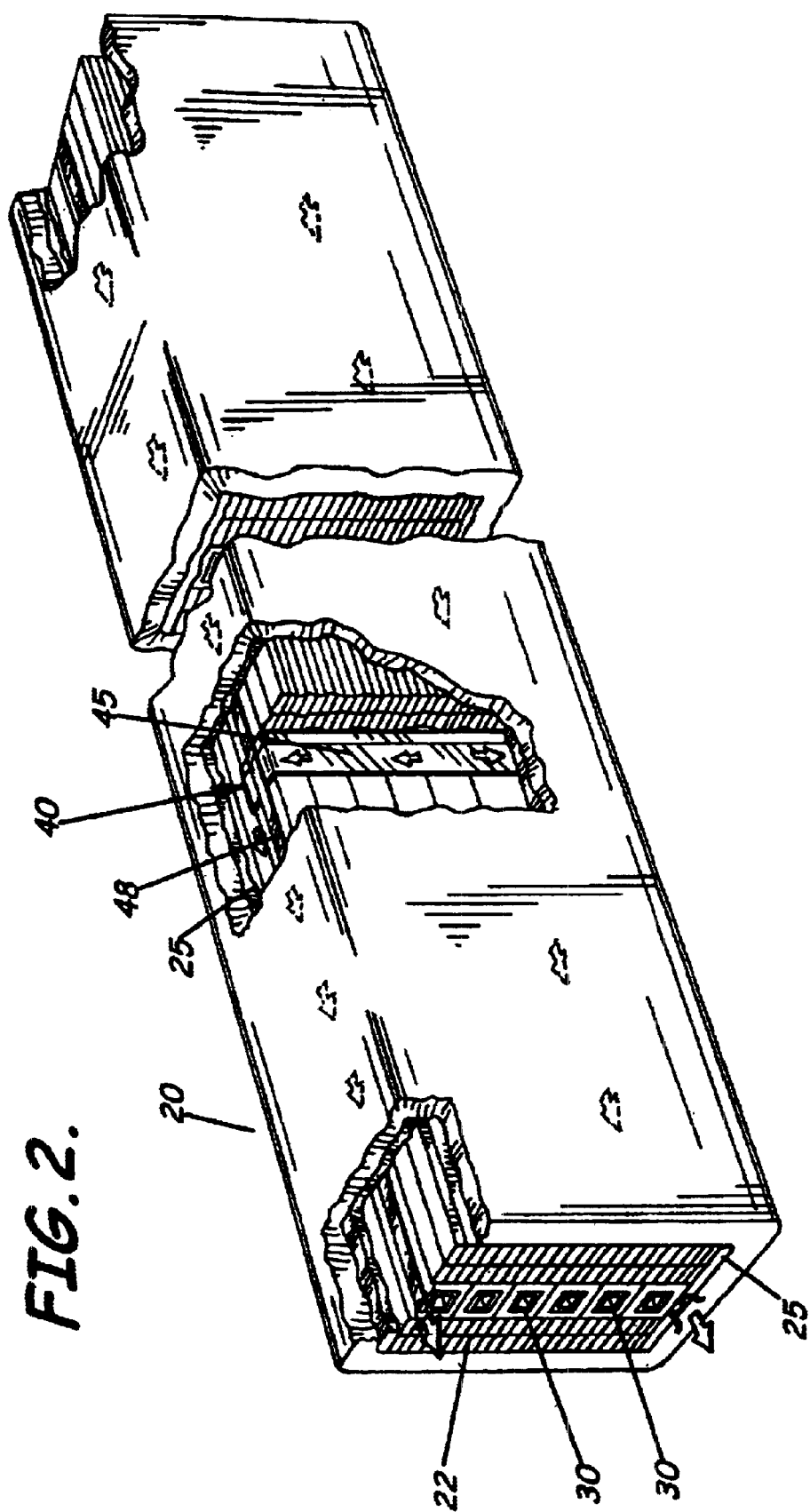
FIG. 2 is a fragmentary perspective view of a stator coil having voltage grading between inner vent tubes and the strands of the coil according to the present invention.
Figure 3:
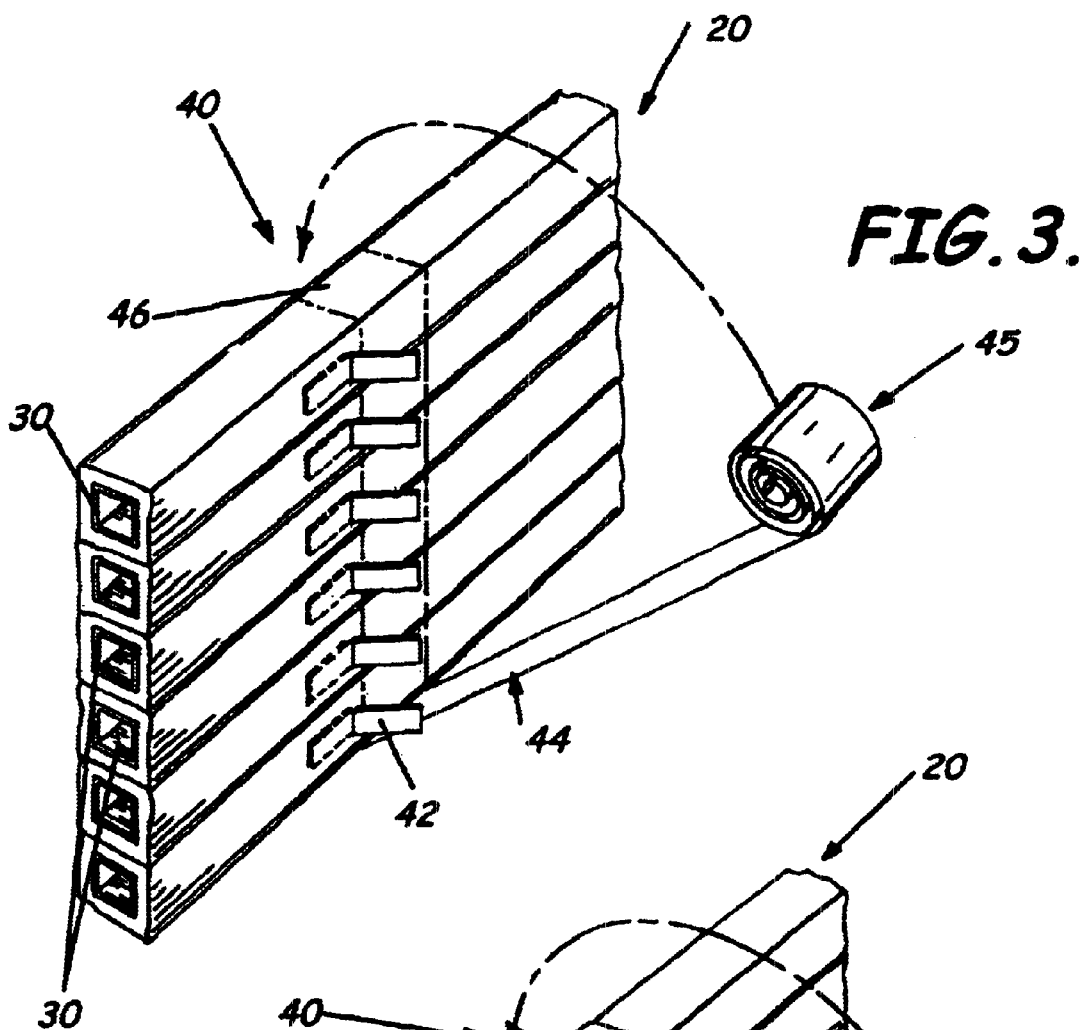
FIG. 3 is a fragmentary perspective view of construction of an over voltage protector of a stator coil having voltage grading between inner vent tubes and the strands of the coil according to the present invention.
Figure 4:
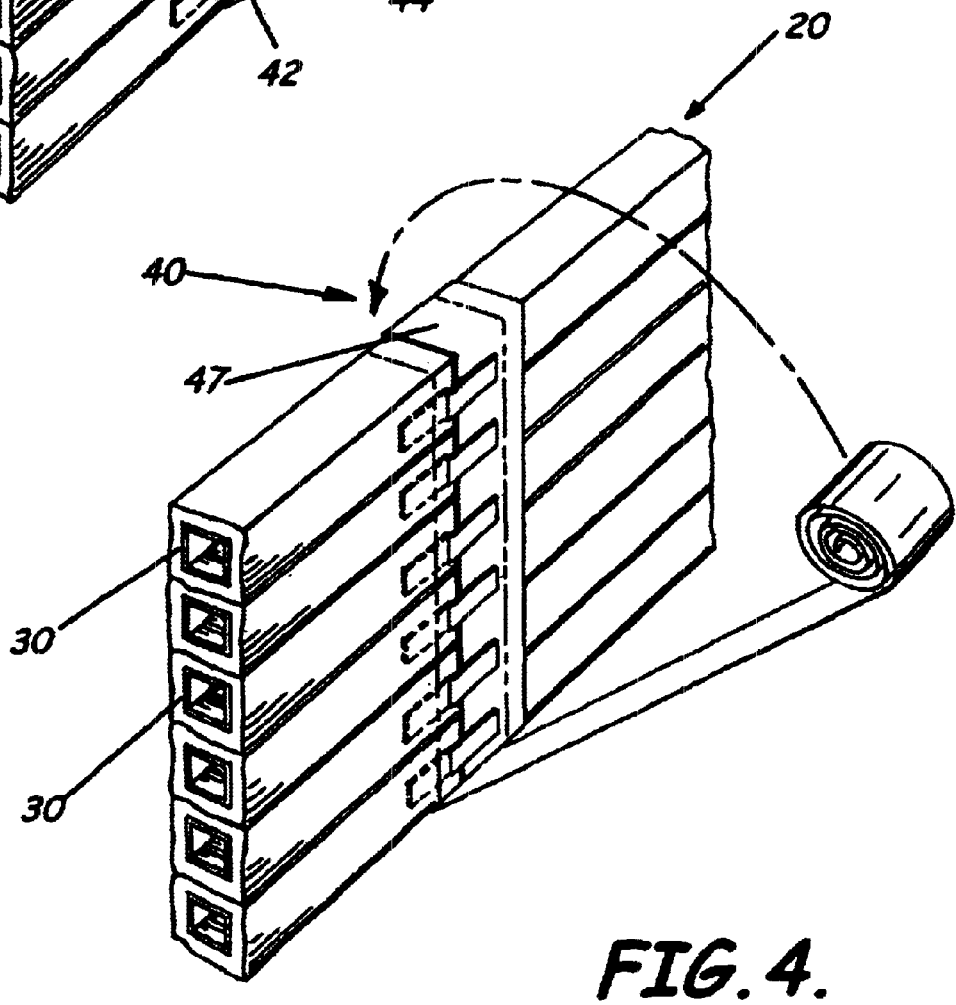
FIG. 4 is an exploded perspective view of a stator coil according to the present invention.

As perhaps best shown in FIGS. 2–4, the compact voltage grading means 40 is preferably provided by a compact overvoltage protector which preferably includes at least a first conductive strip member 42 contacting a conductive portion of each of the plurality of vent tubes 30, a voltage grading layer 44 of material positioned to contact the first conductive strip member 42, and at least a second conductive strip member 48 positioned to contact the plurality of metal strands 22 and the voltage grading layer 44 to thereby provide an electrical flow path between the vent tubes 30 and the metal strands 22. For compactness and access to the inner vent tubes 30, the voltage grading layer 44 preferably includes a plurality of layers 45 of conductive tape. As perhaps best illustrated in FIGS. 3–4, the plurality of layers of tape include a first layer 46 of conductive tape positioned to adhere to each of the plurality of vent tubes 30 and the first conductive strip member 42, and a second layer 47 of conductive tape positioned to adhere to the plurality of vent tubes 30 and the second conductive strip member 48. The compact voltage grading means 40 can further include conductive filler material 25, e.g., conductive Roebel filler such as a resin-rich fleece material, positioned to contact surfaces of the plurality of coil strands 22, the first and second strip members 42, 48 and the voltage grading layer 44 to enhance decreasing of a voltage potential between the plurality of metal strands 22 and the plurality of vent tubes 30.

Figure 5:
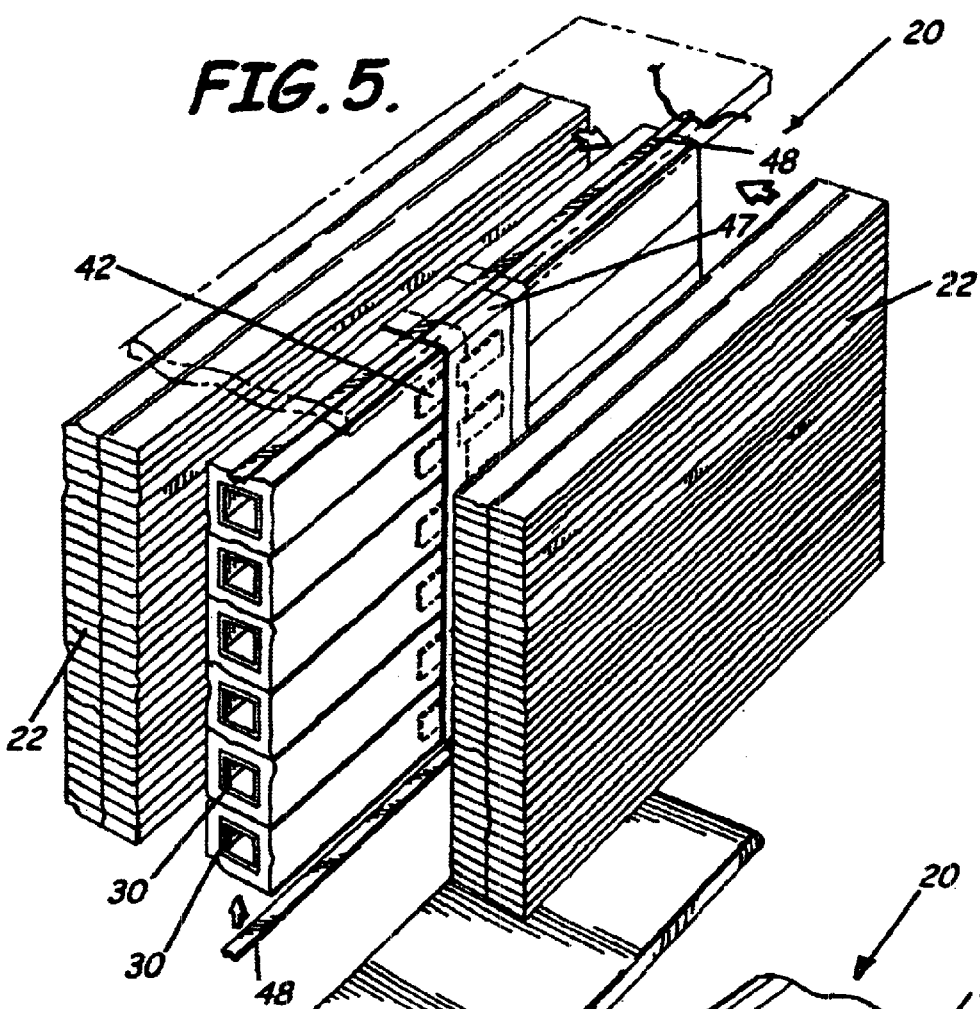
FIG. 5 is another fragmentary perspective view of construction of an over voltage protector of a stator coil according to the present invention.
Figure 6:
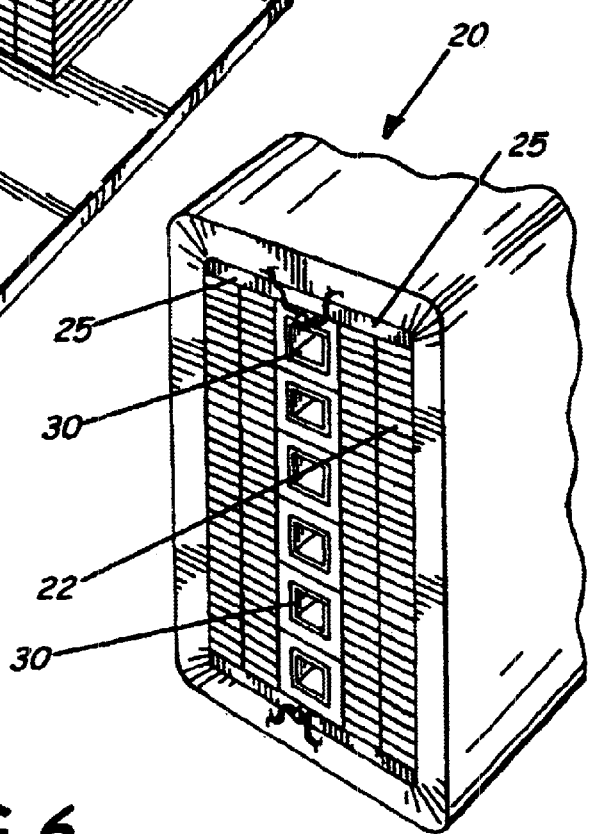
FIG. 6 is a fragmentary perspective view of a stator coil according to the present invention.

The stator coils 20 also preferably include bonding filler material positioned to contact the conductive filler material of the compact voltage grading means 40 to bond the compact voltage grading means 40 to the plurality of stator coils 20. Each of the plurality of vent members 30 preferably has tubular shape and is positioned in a stacked relationship as illustrated in FIGS. 2 and 5–6. The plurality of metal strands 22 are positioned on each side of the stack of tubular-shaped vent members 30.

FIGS. 5–6 illustrate a stator coil according to the present invention which is compact and effective for solving the overvoltage problems. A slit is made in the vent tube insulation and a thin length of copper foil is slid under the vent tube insulation. The dimensions of the copper foil piece, for example, can be about 0.003 inches thick, about 0.250 inches wide, and about 1.5 inches long. The copper foil is very flexible. All vent tubes 30 have the tube insulation slit on the sides of the vent tubes 30 as shown in FIG. 5. After placement of the copper foil under the vent tube insulation, to make good electrical contact with the metal tube, a layer of conductive tape, with about 1000 ohms/ square resistance is wrapped around the vent tube stack making certain the conductive tape is in good electrical contact with the copper foil strips. The copper foil strips are laid over the outer surface of the first layer 46 of conductive tape. A second layer 47 of conductive tape is wrapped around the vent tube stack and covers all the exposed copper foils on the vent tube sides. A thin copper strip of dimensions of about 0.003 inches thick, about 0.250 inches wide, and about equal to the length of the coil, is soldered to a copper strand at one end and extended substantially the entire length of the stator coil 20 on both the coil top and bottom. The copper foil strip lays against the top surface of the insulated top and bottom vent tube and is insulated from both the copper strands 22 and the vent tubes 30. To prevent coil current from flowing in the copper strip, it is connected to the copper strands 22 only at one end of the coil. A conductive Roebel filler material is then applied to both the top and bottom surface of the coil. The conductive Roebel filler makes good electrical contact with the copper strip and forces the potential to be the same magnitude along the coil length. The conductive tape wrapped around the vent tube stack also makes electrical contact with the top and bottom Roebel filler and makes the high resistance connection between coil copper and vent tubes. This resistance forces the voltage between the vent tubes 30 and copper strands 22 to be of a low, safe value to protect the vent-tube-to-copper insulation from an overvoltage condition. The resin rich side filler material that is used for coil consolidation along with the resin rich top and bottom Roebel filler bonds the complete grading system together during coil processing.

Figure 9:
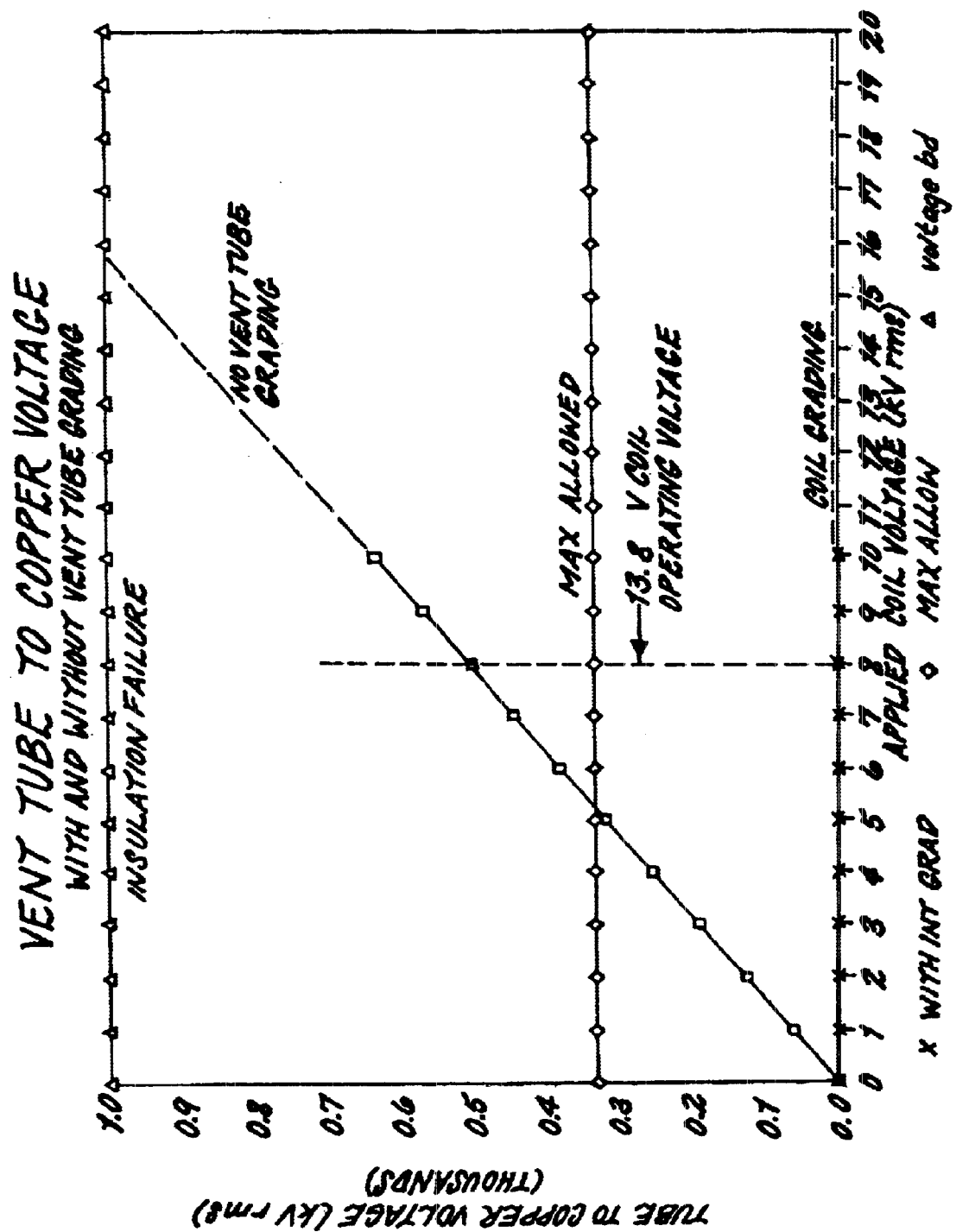
FIG. 9 is a graph of applied voltage versus tube-to-copper voltage with and without vent tube grading according to the present invention.

As illustrated in FIG. 9, a vent tube voltage distribution test was conducted on an inner cooled stator coil 20 according to the present invention. The purpose of the test was to obtain a measure of the voltage level coupled to the vent tubes 30 during normal coil operation. Results indicate that with a stator coil 20 operating at about 8 kVrms, about 504 volts rms will be dropped between the vent tubes 30 and copper strands 22. The failure voltage for the vent-tube-to-copper-strand insulation is on the order of about 700 to 1000 volts rms. Therefore vent tube voltage grading can advantageously be used on this coil design. With the invention applied to the vent tubes 30, the voltage measured between vent tubes 30 and copper strands 22 was on the order of about 5 volts rms with about 8 kVrms on the coil. The plot of the voltage between vent tubes 30 and copper strands 22 is shown in FIG. 9.

As shown in FIGS. 1–9, the present invention also includes a method of grading voltage between internal or inner positioned vent members 30 and conductive strands 22 of a high voltage coil 20 of a power generation system 10. A method preferably includes connecting conductive portions of each of a plurality of internal or inner vent members 30 to a plurality of conductive strands 22 of a high voltage coil 10. The connecting step for each vent member 30 preferably includes forming an opening in insulation 24, e.g., tube to strand insulation, surrounding the vent members 30, positioning a first conductive strip member 42 to contact conductive portions of the vent member 30, positioning a voltage grading layer 44 of material to contact and overlie the first conductive strip member 42, and positioning a second conductive strip member 48 to contact the voltage grading layer 44 and at least one of the plurality of conductive strands 22.

Also, the voltage grading layer 44 preferably includes a plurality of layers 45 of conductive tape, and the step of positioning the voltage grading layer 42 preferably includes adhering a first layer 46 of conductive tape to the first metal strip member 42 and the insulation 24 surrounding the vent member 30 and adhering a second layer 47 of conductive tape to the insulation 24 and the second conductive strip member 48. The method can also include positioning conductive filler material 25 to contact the plurality of conductive strands 22, the first and second conductive strip members 42, 48, and the first and second layers 46, 47 of voltage grading layer 45.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

What is claimed is:

1. A power generation system comprising:

a rotor; and a stator positioned adjacent the rotor, the stator including a plurality of high voltage stator coils, each of the plurality of stator coils including a plurality of metal coil strands, a plurality of metal vent members positioned adjacent to the plurality of coil strands, and compact voltage grading means contacting at least one of the plurality of vent members and at least one of the plurality of metal strands for grading voltage between the plurality of vent members and the plurality of metal coil strand to thereby prevent an overvoltage condition.

2. A power generation system comprising:

a rotor; and a stator positioned adjacent the rotor, the stator including a plurality of high voltage stator coils, each of the plurality of stator coils including a plurality of metal coil strands, a plurality of metal vent members positioned adjacent to the plurality of coil strands, and compact voltage grading means contacting each of the plurality of vent members for grading voltage between the plurality of vent members and the plurality of metal coil strands to thereby prevent an overvoltage condition, wherein the compact voltage grading means includes at least a first conducive strip member contacting a conductive portion of each of the plurality of vent members, a voltage grading layer of material positioned to contact the first conductive strip member, and at least a second conductive strip member positioned to contact the plurality of metal coil strands and the voltage grading layer to thereby provide an electrical flow path between the metal vent members and the metal coil strands.

3. A system as defined in claim 2, wherein the voltage grading layer includes a plurality of layers of conductive tape, the plurality of layers including a first layer of conductive tape positioned to adhere to each of the plurality of vent members and the first conductive strip member, and a second layer of conductive tape positioned to adhere to the plurality of vent members and the second conductive strip member.

4. A system as defined in claim 2, wherein the compact voltage grading means further includes conductive filler material positioned to contact surfaces of the plurality of coil strands, the first and second strip members, and the voltage grading layer to enhance decreasing of a voltage potential between the plurality of metal strands and the plurality of metal vent members.

5. A system as defined in claim 4, wherein each of the stator coils further includes bonding filler material positioned to contact the conductive filler material of the compact voltage grading means to bond the compact voltage grading means to the plurality of stator coils.

6. A system as defined in claim 5, wherein each of the plurality of vent members has tubular shape and are positioned in a stacked relationship, and wherein the plurality of metal coil strands are positioned on each side of the stack of tubular-shaped metal vent members.

7. A high voltage stator coil for a stator of a power generation system, the stator comprising:
 a plurality of metal strands;
 a plurality of vent members positioned adjacent the plurality of metal strands; and
 a low impedance shunt contacting each of the plurality of vent members and the plurality of metal strands for grading voltage between the vent members and the metal strands to thereby prevent an overvoltage condition;
 wherein the low impedance shunt includes at least a first conductive strip member contacting a conductive portion of each of the plurality of vent members, a voltage grading layer of material positioned to contact the first conducive strip member, and at least a second conductive strip member positioned to contact the plurality of metal strands and the voltage grading layer to thereby provide an electrical flow path between the vent members and the metal strands.

8. A stator coil as defined in claim 7, wherein the voltage grading layer includes a plurality of layers of conductive tape, the plurality of layers including a first layer of conductive tape positioned to adhere to each of the plurality of vent members and the first conductive strip member, and a second layer of conductive tape positioned to adhere to the plurality of vent members and the second conductive strip member.

9. A stator coil as defined in claim 8, wherein the low impedance shunt further includes conductive filler material positioned to contact surfaces of the plurality of coil strands, the first and second strip members, and the voltage grading layer to enhance decreasing of a voltage potential between the plurality of metal strands and the plurality of vent members.

10. A stator coil as defined in claim 9, further comprising bonding filler material positioned to contact the conductive filler material of the low impedance shunt to bond the low impedance shunt.

11. A stator coil as defined in claim 10, wherein each of the plurality of vent members has tubular shape and is positioned in a stacked relationship, and wherein the plurality of metal strands are positioned on each side of the stack of tubular-shaped vent members.

* * * * *